(12) United States Patent
Tiwary et al.

(10) Patent No.: US 9,910,512 B1
(45) Date of Patent: Mar. 6, 2018

(54) SYSTEMS AND METHODS FOR USING CURSOR MOVEMENT PROFILES

(71) Applicant: Amazon Technologies, Inc., Seattle, WA (US)

(72) Inventors: Shinjan Kumar Tiwary, Sunnyvale, CA (US); Eric Peter Raeber, Redwood City, CA (US); Singana Dayakar Reddy LNU, Sunnyvale, CA (US); Stephen Allen Whitney, West Sacramento, CA (US); Richard Baker, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 132 days.

(21) Appl. No.: 14/537,426

(22) Filed: Nov. 10, 2014

Related U.S. Application Data

(60) Provisional application No. 62/069,196, filed on Oct. 27, 2014.

(51) Int. Cl.
*G06F 3/033* (2013.01)

(52) U.S. Cl.
CPC .................... *G06F 3/033* (2013.01)

(58) Field of Classification Search
CPC ............................ G06F 3/03548; G06F 1/1616
USPC .................................................. 345/156–184
See application file for complete search history.

(56) References Cited

U.S. PATENT DOCUMENTS

| | | | |
|---|---|---|---|
| 5,473,347 A * | 12/1995 | Collas ................... | G06F 1/1616 345/168 |
| 5,578,817 A | 11/1996 | Bidiville et al. | |
| 5,703,356 A | 12/1997 | Bidiville et al. | |
| 5,854,482 A | 12/1998 | Bidiville et al. | |
| 6,124,587 A | 9/2000 | Bidiville et al. | |
| 6,218,659 B1 | 4/2001 | Bidiville et al. | |
| 8,918,544 B2 | 12/2014 | Chardon et al. | |
| 2007/0027959 A1 | 2/2007 | Harris et al. | |
| 2007/0132733 A1* | 6/2007 | Ram ..................... | G06F 3/0227 345/163 |
| 2008/0042974 A1* | 2/2008 | Sachs .................. | G06F 3/03548 345/157 |
| 2012/0249890 A1 | 10/2012 | Chardon et al. | |
| 2012/0274547 A1 | 11/2012 | Raeber et al. | |
| 2013/0035086 A1 | 2/2013 | Chardon et al. | |

\* cited by examiner

*Primary Examiner* — Carolyn R Edwards
(74) *Attorney, Agent, or Firm* — Eversheds Sutherland (US) LLP

(57) ABSTRACT

Provided are systems and methods for receiving a plurality of response speed profiles associated with an application, selecting a first response speed profile from the plurality of response speed profiles, causing rendering of an on-screen display based at least in part on the first response speed profile, determining that a response speed profile change condition exists, selecting a second response speed profile from the plurality of response speed profiles, and causing rendering of an on-screen display based at least in part on the second response speed profile.

20 Claims, 6 Drawing Sheets

SYSTEMS AND METHODS FOR USING CURSOR MOVEMENT PROFILES

RELATED APPLICATIONS

This patent application claims the benefit of U.S. Provisional Patent Application No. 62/069,196, filed Oct. 27, 2014 and titled "SYSTEMS AND METHODS FOR EMPLOYING CURSOR MOVEMENT PROFILES", which is hereby incorporated by reference in its entirety.

BACKGROUND

Numerous software applications have been developed for use on touch-screen devices. For example, a variety of games developed for use on mobile electronic devices, such as smart phones and tablet computers, rely on a user physically touching a display screen of the device to make a selection, move an on-screen cursor, or the like. This type of touch-based selection can enable a variety of different input techniques. For example, a user may be able to directly select different points or regions of a displayed graphic without dragging their finger across the screen of the device.

Figure 1:
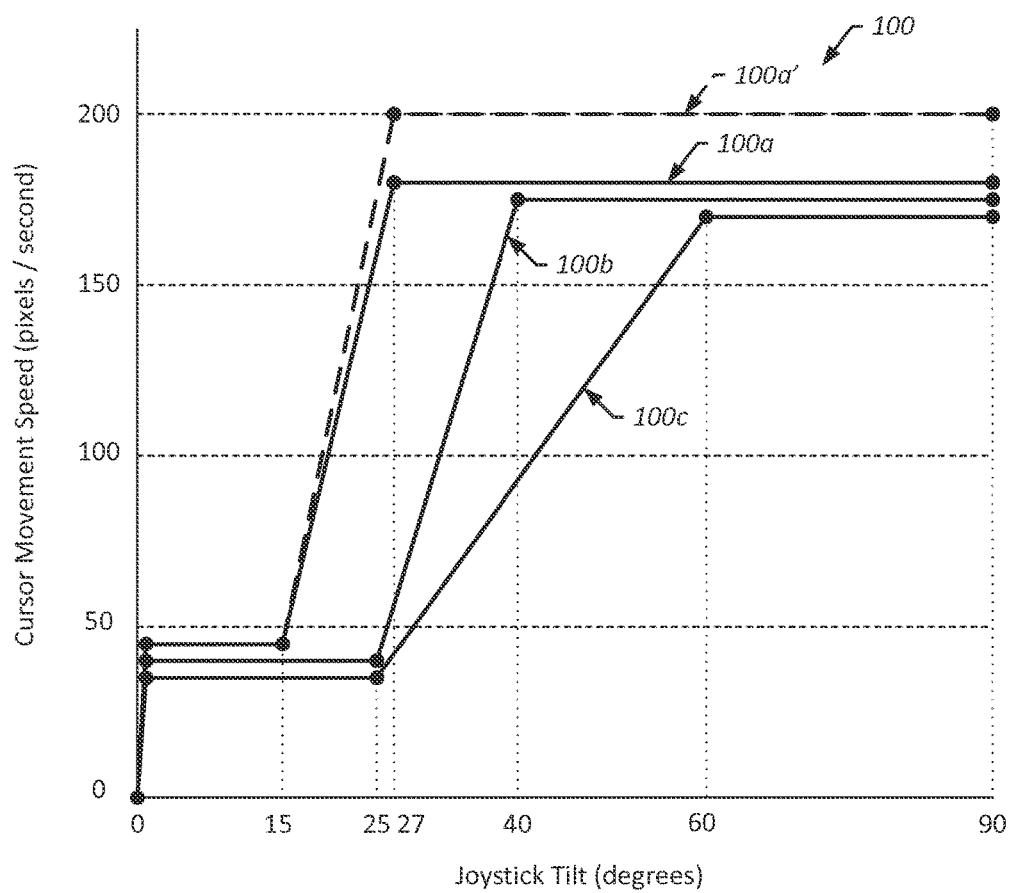
FIG. 1 is a diagram that illustrates example cursor speed curves in accordance with one or more embodiments.

While this disclosure is susceptible to various modifications and alternative forms, specific embodiments thereof are shown by way of example in the drawings and will be described in detail herein. The drawings may not be to scale. It should be understood, however, that the drawings and the detailed description thereto are not intended to limit the disclosure to the particular form disclosed, but to the contrary, the intention is to cover all modifications, equivalents, and alternatives falling within the spirit and scope of the present disclosure as defined by the appended claims.

DETAILED DESCRIPTION

Described herein are systems and methods for employing cursor movement profiles. A response movement profile (e.g., a "cursor movement profile") may include a mapping or similar data structure that defines how a displayed element (e.g., a cursor) moves, or otherwise responds to a corresponding input. Such inputs may be provided via any variety of user input devices, such as a joystick, a computer mouse, a keyboard, and/or the like. In the context of a computer game, for example, a cursor movement profile may map physical movements and/or positions of a joystick-type input device to particular movements and/or positions of a cursor (also referred to as an "on-screen cursor"), or a similar element, displayed in the game. Such a cursor profile may, for example, map a small displacement of the joystick (e.g., a slight tilting of the joystick from its "zero" position) to a relatively slow movement of the on-screen cursor in the direction of displacement, and may map a large displacement of the joystick (e.g., a large tilting of the joystick in a given direction) to a relatively fast movement of the on-screen cursor in the direction of displacement. Although certain embodiments are described in the context of a joystick for the purpose of illustration, it will be appreciated that the described techniques can be employed for any variety of different types of input devices. Moreover, although certain embodiments are described in the context of movement of an on-screen cursor for the purpose of illustration, embodiments can be provided in other context. For example, speed curves can be used to control responses to user inputs for which an on-screen cursor may not be displayed.

A joystick device can includes a stick (or "joystick") that pivots on a base and reports its position (e.g., angle of tilt and/or direction of tilt) to another device, such as a device executing an application the joystick is being used to control. In some embodiments, a joystick can be tilted from 0° to 90° in all directions (e.g., 360° of rotation) to command movement of an on-screen cursor. For example, in a typical joystick configuration, a user may move the joystick upward, to the right, down, to the left, or a combination thereof to command an on-screen cursor to move up, right, down, left, or a combination thereof, respectively, on the screen. That is, the direction of displacement of the joystick can control the direction of movement of a corresponding on-screen cursor. In such a configuration, the "default", "zero" or "center" position may refer to a position at which the joystick is not tilted, or otherwise displaced. In many instances, a joystick can be biased to the zero position, and the user can move the joystick from the zero position to command movement of the on-screen cursor. In some instances, the speed of movement of an on-screen cursor may correspond to the displacement of the joystick. For example, if the joystick is tilted 90° in a given direction, then the on-screen cursor may move relatively fast in the direction; if the joystick is tilted 45° in the given direction, then the on-screen cursor may move at a moderate speed in the direction; and if the joystick is tilted 5° in the given direction, then the on-screen cursor may move at a relatively slow speed in the direction. In some instances, a cursor movement profile can map the position of the joystick to corresponding directions and/or speeds of cursor movement and/or corresponding cursor locations.

A response movement profile (e.g., cursor movement profile) may include one or more response directional profiles (e.g., "cursor direction profiles" or "cursor direction maps") that define directions of movement associated with user inputs (e.g., directions of cursor movements associated with user inputs) and/or one or more response speed profiles (e.g., "cursor speed profiles" or "cursor speed curves") that define speeds associated with user inputs (e.g., speeds of cursor movements associated with user inputs). A cursor direction profile may define, for example, that an on-screen cursor should move up, right, down, left, or a combination thereof, in response to a corresponding movement of the joystick upward, to the right, down, to the left, or a combination thereof. A cursor speed curve may define, for example, that an on-screen cursor should move relatively fast if the joystick is tilted 90°, that the on-screen cursor should move at a moderate speed if the joystick is tilted 45°, and that the on-screen cursor should move at a relatively slow speed if the joystick is tilted 5°. Thus, for example, a cursor movement profile that includes a combination of a cursor direction map and a speed curve can define the direction and speed of movement of an on-screen cursor in response to an input commanding cursor movement. In some embodiments, different cursor movement profiles can define different responses for similar inputs. In the context of a joystick, for example, a sensitive cursor movement profile may include a highly sensitive cursor speed curve that causes rapid movement of an on-screen cursor in response to manipulation of the joystick. In contrast, a less sensitive cursor movement profile may include a moderately sensitive cursor speed curve that causes slow movement of the on-screen cursor in response to the same manipulation of the joystick. In some embodiments, a cursor movement profile can include different cursor speed curves that can be employed for different conditions. For example, a cursor movement profile for a game may include different cursor speed curves that can be used with different levels of the game.

In some embodiments, a cursor movement profile can include a position profile (or an "absolute cursor position profile"). Such a position profile may map positions of the input device to on-screen cursor positions. In the context of a joystick device, for example, an absolute cursor position profile may map a first joystick position (e.g., a zero or center position having a tilt of) 0° to a center region of the display screen (such that a cursor is positioned in the center of the screen when the joystick is in the first position), map a second joystick position (e.g., having a tilt 90° degrees and an orientation of 315°) to an upper-left region of the display screen (such that a cursor is positioned in an upper-left quadrant of the screen when the joystick is in the first position), and so forth. Thus, the on-screen cursor may be located at an on-screen position corresponding to the current position of the joystick.

FIG. 1 is a diagram that illustrates example cursor speed curves 100 (e.g., cursor speed curves 100a, 100b and 100c) in accordance with one or more embodiments. Each of the cursor speed curves 100a, 100b and 100c may be included in one or more cursor movement profiles. For example, a single cursor movement profile may include some or all of the three cursor speed curves 100a, 100b and 100c. For example, each of the cursor speed curves 100 may be used with a joystick that can be tilted (or displaced) from 0° to 90°. Each of the illustrated cursor speed curves 100 maps a cursor speed factor (e.g., a "cursor movement speed") to an input (e.g., displacement of a joystick from 0° to 90°). The cursor movement speed may define a rate of movement or speed for an on-screen cursor (e.g., how fast or slow an on-screen cursor moves). In some embodiments, the cursor speed factor may be an absolute speed (e.g., 100 pixels per second (pixels/sec)). Thus, for example, if a tilt of 45° corresponds to a speed of 100 pixels/sec and a user holds the joystick at a tilt of 45° in the upward direction, then the on-screen cursor may move upward at a rate of 100 pixels/sec. In some embodiments, the cursor speed factor may be a multiplier (e.g., 2×). Thus, for example, if a tilt of 45° generally corresponds to a speed of 50 pixels/sec for an application and a 2× multiplier on the cursor speed curve, and the user holds the joystick at a tilt of 45° in the upward direction while interacting with the application, then the on-screen cursor may move upward at a rate of 100 pixels/ sec (e.g., 2×50 pixels/sec).

Although certain embodiments are described in the context of a rate of movement expressed as pixels per second for the purpose of illustration, rates of movement may be defined in any suitable manner. For example, a rate may be defined by a number of pixels per temporally consecutive frames rendered for display (or presentation). For example, a cursor movement rate of 100 pixels/frame may correspond to the position of an on-screen cursor changing in position by 100 pixels from a display of a given frame in a frame sequence to the display of the next frame in the frame sequence. That is, for example, if a user is holding a joystick at a position that corresponds to upward movement at a rate of 100 pixels/frame, the cursor may be positioned at a first on-screen location (e.g., at pixel coordinates of (100,100)) during display of a first frame of a frame sequence, and may be displayed at a second on-screen location that is 100 pixels higher in the display (e.g., at pixel coordinates of (100,200)) during display of the next (or second) frame of the frame sequence.

In the illustrated embodiment, a first cursor speed curve 100a may be a "highly sensitive" speed curve, a second cursor speed curve 100b may be a "moderately sensitive" cursor speed curve, and the third cursor speed curve 100c may be a "less sensitive" cursor speed curve. In accordance with the illustrated embodiment, the first or highly sensitive cursor speed curve 100a may define movement of the on-screen cursor at a rate of about 45 pixels/sec for a joystick tilt in the range of about 1° to 15°, with the rate increasing linearly to about 180 pixels/sec over the range of about 15° to 27° of tilt, and maintaining a rate of about 180 pixels/sec for a joystick tilt above about 27° (e.g., about 27° to 90° of tilt). The second or moderately sensitive cursor speed curve 100b may define movement of the on-screen cursor at a rate of about 40 pixels/sec for a joystick tilt in the range of about 1° to 25°, with the rate increasing linearly to about 175 pixels/sec over the range of about 25° to 40° of tilt, and maintaining a rate of about 175 pixels/sec for a joystick tilt above about 40° (e.g., about 40° to 90° of tilt). The third or less sensitive cursor speed curve 100c may define movement of the on-screen cursor at a rate of about 35 pixels/sec for a joystick tilt in the range of about 1° to 25°, with the rate increasing linearly to about 170 pixels/sec over the range of about 25° to 60° of tilt, and maintaining a rate of about 170 pixels/sec for a joystick tilt above about 60° (e.g., about 60° to 90° of tilt). As discussed herein, the cursor speed curve 100a' may be a modified version of the highly sensitive cursor speed curve 100a, including a maximum cursor movement speed of about 200 pixels/sec.

Figure 2A:
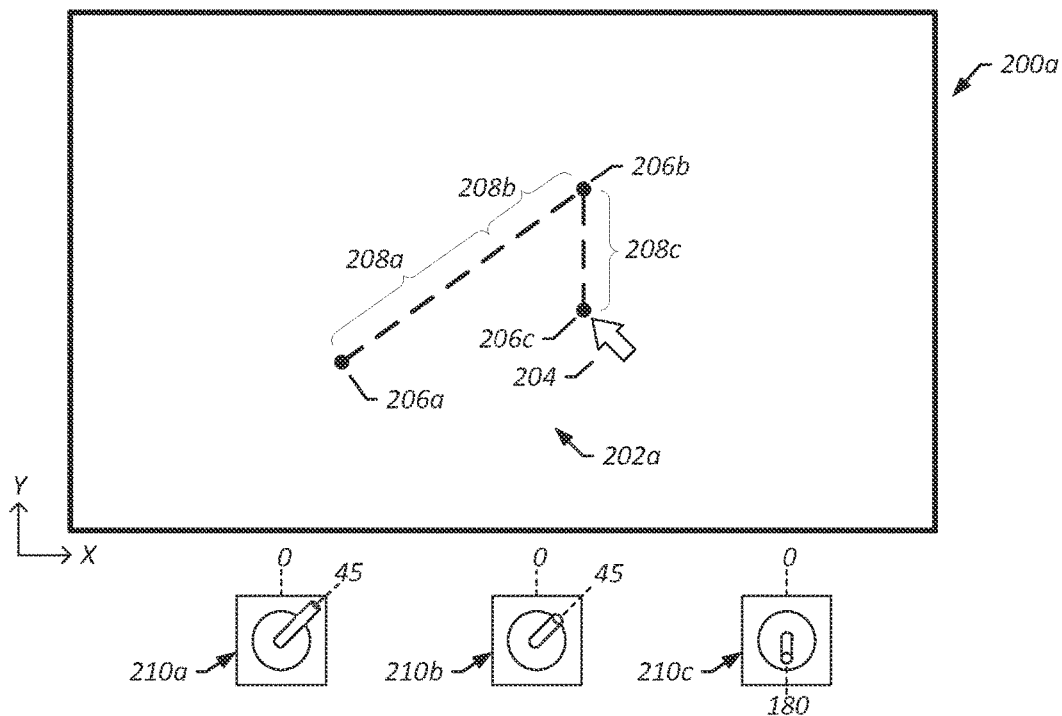
FIGS. 2A-2B are diagrams that illustrate example cursor movements in a graphical user interface (GUI) in accordance with one or more embodiments.
Figure 2B:
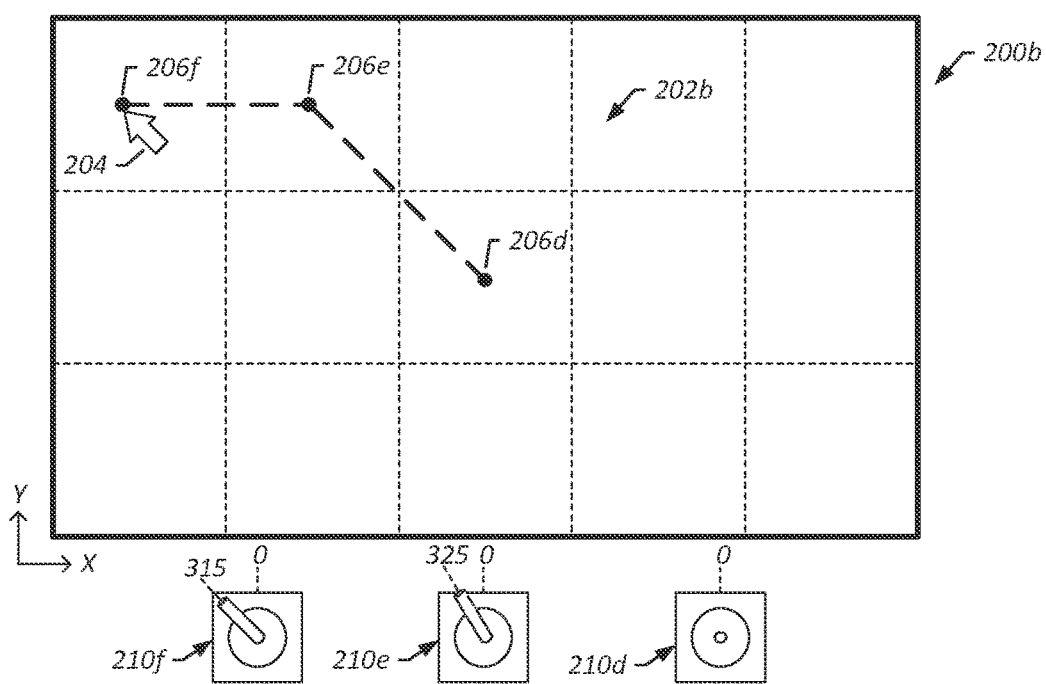

FIGS. 2A-2B are diagrams that illustrate example cursor movements (e.g., on-screen cursor movements) displayed in graphical user interfaces (GUIs) 200a and 200b in accordance with one or more embodiments. The illustrated embodiments include an x-axis corresponding to a horizontal direction (e.g., left-right), and a y-axis corresponding to a vertical direction (e.g., up-down). FIG. 2A illustrates a cursor path 202a associated with moving an on-screen cursor 204 from a first on-screen location (or "location") 206a, to a second on-screen location 206b, and then to a third on-screen location 206c. The cursor path 202a may be defined using a cursor movement profile that includes a cursor direction profile and/or a cursor speed curve. To move the cursor 204 along the path 202a, a user may tilt a joystick up-and-to-the-right to cause movement of the cursor 204 from the first location 206a to the second location 206b and then tilt the joystick downward to cause movement of the cursor 204 from the second location 206b to the third location 206c. The directional components of the path 202a may be defined, for example, by a cursor direction profile of a corresponding cursor movement profile. In some embodiments, a first portion 208a of the path 202a may be generated in response to the user tilting the joystick at an angle of about 90° in a direction up-and-to-the-right at an orientation of about 45°) (e.g., as illustrated by the joystick 210a), a second portion 208b of the path 202a may be generated in response to the user tilting the joystick at an angle of about 45° in a direction up-and-to-the-right at an orientation of about 45° (e.g., as illustrated by the joystick 210b), and a third portion 208c of the path 202a may be generated in response to the user tilting the joystick at an angle of about 5° in a downward direction at an orientation of about 180° (e.g., as illustrated by the joystick 210c). The speed components of the path 202a may be defined, for example, by a cursor speed curve of the corresponding cursor movement profile. Thus, if the third speed curve 100c of FIG. 1 is being employed, for example, then the path 202a may include the cursor 204 moving at a relatively high rate of speed (e.g., about 170 pixels/sec) over the first portion 208a of the path 202a, the cursor 204 moving at a relatively moderate rate of speed (e.g., about 100 pixels/sec) over the second portion 208b of the path 202a, and the cursor 204 moving at a relatively slow rate of speed (e.g., about 35 pixels/sec) over the third portion 208c of the path 202c. With regard to the illustrated embodiment, it may be determined that the user made two discrete moves to arrive at the location 206c from the location 206a.

FIG. 2B illustrates a cursor path 202b associated with moving an on-screen cursor 204 from a first on-screen location (or "location") 206d, to a second on-screen location 206e, to a third on-screen location 206f. The on-screen cursor locations may be defined using a cursor movement profile that includes a cursor position profile (or an "absolute cursor position profile"). To move the cursor 204 along the path 202b, a user may initially hold the joystick at the zero position (e.g., at about 0° of tilt, as illustrated by the joystick 210d), move and hold a joystick up-and-to-the-left (e.g., at about 90° of tilt and a direction of about the 325°, as illustrated by the joystick 210e) to cause movement of the cursor 204 from the first location 206d to the second location 206e, and, then move and hold the joystick further up-and-to-the-left (e.g., at about 90° of tilt and a direction of about the 315°, as illustrated by the joystick 210f) to cause movement of the cursor 204 from the second location 206e to the third location 206f. Thus, the positions of the on-screen cursor 204 for each position of the joystick may be defined, for example, by the cursor position profile of a corresponding cursor movement profile.

In some embodiments, cursor speed curves are user selectable. For example, a user may be able to select a given cursor speed curve before a gaming session, and/or may select to change to a different cursor speed curve later, during the same gaming session. In some embodiments, cursor speed curves can be programmatically (or automatically) selected. For example, a system may choose to employ a given cursor speed curve based on the application (e.g., what game is being played), a mode (e.g., what level is being played), a user's historical use of a speed curve (e.g., the speed curve previously selected by the user for use with a given activity), and/or the like. With regard to application modes, for example, a gaming application may programmatically switch from use of a first cursor speed curve, to use of a second cursor speed curve when play of the gaming application moves from a first level to a second level. That is, for example, a gaming application may employ a first cursor speed curve (e.g., the cursor speed curve 100a of FIG. 1) during play of a first level of the game, and employ a second cursor speed curve (e.g., the cursor speed curve 100b of FIG. 1) during play of a second level of the game. With regard to a user's historical use of a speed curve, for example, a gaming application may programmatically switch to the last speed curve that the user selected and/or used during a similar activity in a previous interaction with the application. That is, for example, if a user is playing level two of a game, and the last time the user played level two of the game, the user selected to use the moderately sensitive cursor speed curve 100b of FIG. 1, then, the gaming application may programmatically select the cursor speed curve 100b for use during play of level two of the game.

Figure 3:
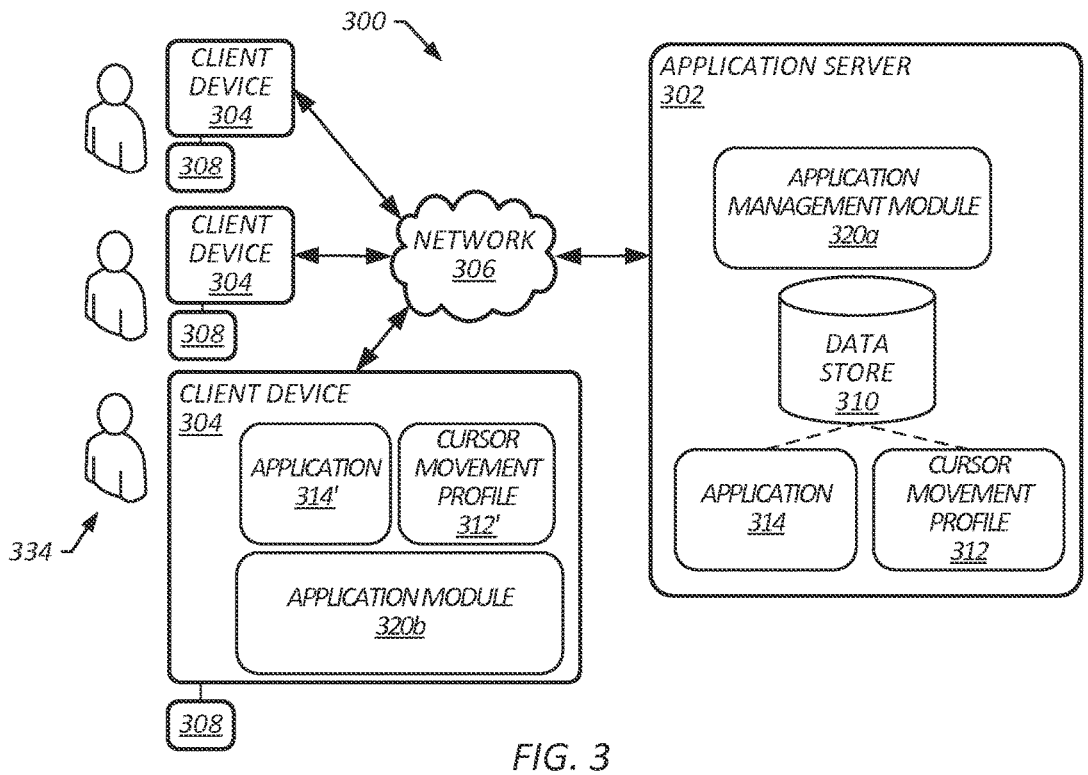
FIG. 3 is a diagram that illustrates an example application environment in accordance with one or more embodiments.

FIG. 3 is a diagram that illustrates an application environment 300 in accordance with one or more embodiments. In some embodiments, the environment 300 can include an application server ("server") 302 coupled to one or more client devices ("clients") 304 via a communications network ("network") 306. In some embodiments, the client devices 304 can include (or are otherwise communicatively coupled to) one or more user input devices ("input devices") 308, such as a joystick. In some embodiments, the server 302 can include or otherwise have access to a data store 310. As discussed herein, the data store 310 may store information, such as applications 314 and corresponding cursor movement profiles 312 (also referred to as master applications 314 and corresponding master cursor movement profiles 312). In some embodiments, a client device 304 may store a local copy of applications 314 and/or corresponding cursor movement profiles 312 it has received from the server 302 (also referred to as local applications 314' and local cursor movement profiles 312'). The local copy of applications 314 and/or corresponding cursor movement profiles 312 may be stored in a memory of the client device 304, for example.

In some embodiments, the server 302 can be employed to manage updated versions of the master applications 314 and/or the cursor movement profiles 312, and/or to provide copies of the master applications 314 and/or the cursor movement profiles 312 to the client devices 304 and/or other network entities. In some embodiments, the server 302 can include an application management module 320a. The application management module 320a may be employed to perform some or all of the various functions described with regard to the server 302. The application management module 320a may be employed, for example, to perform some or all of the portions of the method 600 described herein. Although certain embodiments are described with regard to a single server 302 for the purpose of illustration, embodiments may include employing multiple servers 302, such as a plurality of distributed servers 302. In some embodiments, the server 302 can include one or more computer systems similar to that of the computer system 1000 described herein with regard to at least FIG. 7.

A client device 304 may include any variety of electronic devices. A client device 304 may include, for example, one or more of a personal computer, a server, a laptop computer, a tablet computer, a personal digital assistant (PDA), a smart phone, a set-top device (e.g., a set-top gaming system or gaming console), a media streaming device, and/or the like. For example, a client device 304 may include a Fire TV® set-top box provided by Amazon.com, Inc. having offices in Seattle, Wash. A client device 304 may include a device capable of communicating information via the network 306, and may be a client of the application server 302. A client device 304 may include various input/output (I/O) interfaces and peripheral devices, such as a graphical user interface (e.g., a display screen), an audible output user interface (e.g., a speaker), an audible input user interface (e.g., a microphone), an image acquisition interface (e.g., a camera), a physical input device (e.g., a keyboard, a joystick, a mouse, a trackball, a touchpad, a touch screen, a stylus or the like), a printer, and/or the like. A client device 304 may include general computing components and/or embedded systems optimized with specific components for performing specific tasks. A client device 304 may include programs (or applications) that can be used to generate a request for content, to provide content, to render content, and/or to send/receive requests to/from other devices via the network 306. Such programs may include, for example, client applications used for communicating with the server 302. In some embodiments, the client device 304 may include an application module 320b. The application module 320b may be employed to perform some or all of the various functions described with regard to the client device 304. The application module 320b may be employed, for example, to perform some or all of the portions of the method 500 described herein. In some embodiments, a client device 304 can include one or more computer systems similar to that of the computer system 1000 described herein with regard to at least FIG. 7.

The network 306 may include an element or system that facilitates communication between entities of the environment 300. For example, the network 306 may include an electronic communications network, such as the Internet, a local area network (LAN), a wide area network (WAN), a wireless local area network (WLAN), a cellular communications network, and/or the like. In some embodiments, the network 306 can include a single network or a combination of networks.

The data store 310 may include a medium for the storage of data thereon. The data store 310 may include a non-transitory computer-readable medium storing data thereon that is accessible by various entities of the environment 300, such as a data store management system, or database management system (DBMS), of the server 302. In some embodiments, the data store 310 may include a database storing one or more applications 314 and/or one or more cursor movement profiles 312 that can be employed with the applications 314.

Figure 4:
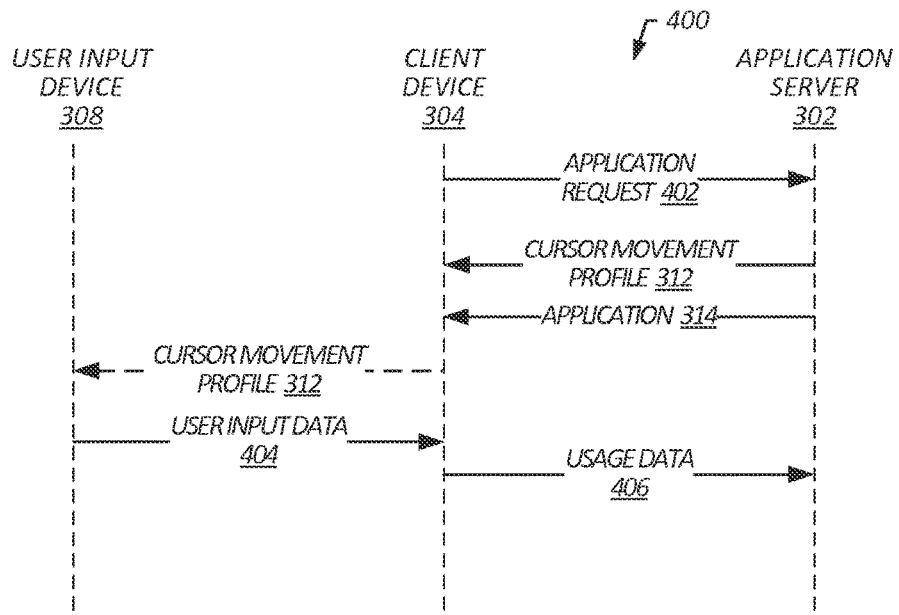
FIG. 4 is a dataflow diagram that illustrates an example dataflow in accordance with one or more embodiments.

FIG. 4 is a dataflow diagram 400 that illustrates an example dataflow (e.g., in the application environment 300) in accordance with one or more embodiments. In some embodiments, for example, a user 334 may request to access an application 314 (e.g., a game), on his or her client device 304. In response to the user's request, the client device 304 may send a corresponding application request 402 (e.g., a request for the game) to the application server 302. In response to receiving the application request 402, the application server 302 may retrieve (e.g., from the data store 310) the master application 314 corresponding to the request 402 and/or a master cursor movement profile 312 corresponding to the application 314. The master cursor movement profile 312 may include, for example, a set of one or more cursor speed curves 100 (e.g., speed curves 100a, 100b, 100c and/or the like). The application server 302 may serve, to the client device 304, a copy of the application 314 and/or the corresponding master cursor movement profile 312. The client device 304 may store a local copy of the master application 314 and/or the corresponding master cursor movement profile 312 in a memory of the client device 304 (these may be referred to as the "local" application 314' and the "local" cursor movement profile 312'). The client device 304 may execute the local application 314', and may receive user input data 404 indicative of the user interactions therewith. The user input data 404 may be indicative of manipulation of the user input device 308 by the user 334 (e.g., the data may include reporting of the positions—tilt and orientation—of a joystick-type user input device 308 as the user interacts with the application). The client device 304 may use the local cursor movement profile 312' to interpret the user input data 404 received from the user input device 308. For example, the client device 304 may use the local cursor movement profile 312' to determine and generate on-screen cursor movements that correspond to the manipulation of the user input device 308 by the user 334. If the local application 314' includes a game played using a joystick and the local cursor movement profile 312' includes a cursor speed curve 100 for use with the game, for example, then the client device 304 may use the reported joystick tilt data (e.g., user input data 404) and the cursor speed curve 100 to determine the speed of movement of an on-screen cursor in the game.

In some embodiments, a "local" cursor movement profile 312' may be stored on the user input device 308. In such an embodiment, if the local cursor movement profile 312' stored on the user input device 308 includes a cursor speed curve 100 for use with the game, for example, then, the user input device 308 may use joystick tilt data (e.g., user input data 404) and the cursor speed curve 100 to determine the speed of movement of an on-screen cursor in the game, and report that speed via the user input data 404. That is, for example, a joystick may determine cursor movement characteristics (e.g., cursor speed) based on the raw input data it receives (e.g., the position of the joystick) as the user plays a game, and report those characteristics to the client device 304 via the user input data 404. The client device 304 may use the cursor movement characteristics to determine and generate a corresponding on-screen cursor movement during play of the game.

In some embodiments, the user input data 404 may include data indicative of user selection of a cursor speed curve 100 of the cursor movement profile 312'. In response to receiving such user input data 404, the client device 304 may, in turn, use the selected cursor speed curve 100 to determine and generate on-screen cursor movements. Continuing with the above example of a game played using a joystick, if the moderately sensitive cursor speed curve 100b of FIG. 1 is currently selected or otherwise being used, and the user 334 manually selects to use more sensitive cursor speed curve (e.g., cursor speed curve 100a of FIG. 1), then the client device 304 may use joystick tilt data (e.g., user input data 404) and the cursor speed curve 100a to determine the speed of movement of an on-screen cursor during play of the game.

In some embodiments, the client device 304 can programmatically (or automatically) select a cursor speed curve 100 of the cursor movement profile 312'. For example, the client device 304 may programmatically select to use a cursor speed curve 100 that is associated with a current mode of the application 314'. Continuing with the above example, if the first and second levels of the game are associated with the cursor speed curves 100a and 100b, respectively, the client device 304 may programmatically select to use cursor speed curve 100a during play of the first level of the game and programmatically select to use the second cursor speed curve 100b during play of the second level of the game. In some embodiments, the cursor speed curve 100 associated with a mode may be specified as a default for the mode and/or may be associated with the mode based on prior use with the mode. For example, if the cursor speed curves 100a and 100b are specified as "default" speed curves 100 for the first and second levels, respectively, of the game, then the first time the user 334 plays the game, the client device 304 may programmatically select to use cursor speed curve 100a during play of the first level of the game and programmatically switch to use the second cursor speed curve 100b during play of the second level of the game. If, however, the user manually selects to use the cursor speed curve 100c during play of the first level (e.g., manually change the cursor speed curve 100 associated with the first level of the game), then the client device 304 may programmatically select to use cursor speed curve 100c the next time the user 334 plays the first level of the game. Thus, a default cursor speed curve 100 associated with a given mode of an application may be used, unless another cursor speed curve 100 has been selected for that mode.

In some embodiments, the local cursor movement profile 312' can be updated to reflect which cursor speed curves 100 are selected for the various modes of the application 314'. For example, if the initial version of the local cursor movement profile 312' (e.g., the locally stored copy of the master cursor movement profile 312) received from the server 302 specifies that the cursor speed curves 100a, 100b and 100c are "default" speed curves 100 for use with the first and second levels, respectively, of the game, and during play of the game, the user 334 manually selects to use the cursor speed curve 100c for play of the first level, and the cursor speed curve 100a is programmatically selected for use during play of the second level of the game, and the user 334 plays the third level using the cursor speed curve 100c, then the client device 304 may update the local cursor movement profile 312' to specify that the cursor speed curves 100c, 100a and 100c are the cursor speed curves 100 for subsequent use with the first, second and third levels, respectively, of the game (e.g., they are the default speed curves 100 for those levels moving forward).

In some embodiments, the client device 304 may transmit usage data 406 to the application server 302. The usage data 406 may include, for example, data including or otherwise indicative of the user input data 404 received by the client device 304, a current (or updated) version of the local cursor movement profile 312' (e.g., including the currently selected cursor speed curves 100 for the application 314' and/or the various modes of the application 314') and/or the like. The usage data 406 may be transmitted to the application server 302 on a regular basis (e.g., daily, weekly, monthly, and/or the like) and/or in response to a triggering event (e.g., in response to the user 334 exiting the application 314').

In some embodiments, the usage data 406 can be used by the application server 302 to update the master cursor movement profile 312 associated with the application 314. For example, the usage data 406 may be used to select which cursor speed curves 100 are included within the master cursor movement profile 312 for the application 314 and/or which cursor speed curves 100 of the master cursor movement profile 312 are associated with the various modes of the application 314. Continuing with the above example of a game, if the usage data 406 received from multiple users 334 (e.g., received from multiple different client devices 304) includes multiple updated local cursor movement profiles 312', and in the majority of those local cursor movement profiles 312', the cursor speed curve 100c is associated with the first level of the game, then the master cursor movement profile 312 may be updated (or otherwise modified) to specify that the cursor speed curve 100c is the default speed curve for use with the first level of the game.

In some embodiments, the updated (or modified) master cursor movement profile 312 associated with the application 314 (e.g., identifying the speed curves 100 selected for use with or otherwise associated with the various modes of the application 314) may be provided for subsequent use with the application 314. If the application server 302 subsequently receives, from a client device 304, a request 402 for an application 314, for example, then the application server 302 may serve, to the requesting client device 304, a copy of the application 314 and the updated master cursor movement profile 312. Continuing with the above example of a game, if the application server 302 subsequently receives, from a client device 304, a request 402 for the game, then the application server 302 may serve, to the requesting client device 304, a copy of the game and the updated master cursor movement profile 312 for the game. In accordance with the above example, the updated master cursor movement profile 312 may specify that the cursor speed curve 100c is the default speed curve 100 for the first level of the game.

In some embodiments, the server 302 may programmatically provide updated cursor movement profiles 312 to the client device 304. For example, the server 302 may push a copy of the updated master cursor movement profile 312 to the client devices 304 that already have local copies of the corresponding application 314. A copy of the updated master cursor movement profiles 312 may be pushed to the client device 304 on a regular basis (e.g., daily, weekly, monthly, and/or the like) and/or in response to a triggering event (e.g., in response to changes to the master cursor movement profiles 312). Continuing with the above example, the server 302 may push the updated cursor movement profile 312 (e.g., that specifies that the cursor speed curve 100c is the default speed curve 100 for the first level of the game) to the client devices 304 that have already downloaded the game.

In some embodiments, the client device 304 may use the copy of the updated master cursor movement profile 312 to update only the portions of the local cursor movement profile 312' that have not already been used or modified. Continuing with the above example, if the user 334 has played levels one and two of the game, and the copy of the updated master cursor movement profile 312 has changed the default cursor speed curve 100 for the second level of the game from curve 100b to curve 100a and changed the default cursor speed curve 100 for the third level of the game from curve 100c to curve 100a, then the local cursor movement profile 312' may be updated to specify that the cursor speed curve 100a is associated with the third level of the game (e.g., based on the updated master cursor movement profiles 312 changing the default cursor speed curve 100 for the third level of the game from curve 100c to curve 100a), but the cursor speed curve 100b may remain associated with the second level of the game (e.g., based on the user 334 having already played that level using the cursor speed curve 100b). In some embodiments, the client device 304 may use the copy of the updated master cursor movement profile 312 to update the local cursor movement profile 312'. For example, the updated cursor movement profile 312 may replace the current local cursor movement profile 312' stored on the client device 304.

In some embodiments, a cursor speed curve 100 can be modified based on historical user interactions using the speed curve 100. For example, if monitoring behavioral data during a user's interaction with an application 314' while using a speed curve 100 reveals that the user 334 is predisposed to some behavior, then the cursor speed curve 100 may be modified to account for the user's behavior. If the monitored user input data 404 received while the user 334 is playing the gaming application 314' using a speed curve 100a of the local cursor movement profile 312' indicates, for example, that the user 334 tilts his or her joystick to its limits for a threshold percentage of the time (e.g., during 50% of the play or more), indicating that the user 334 wants the on-screen cursor to move faster while playing the game, then the cursor speed curve 100a may be modified to provide faster cursor movements. With regard to the first cursor speed curve 100a of FIG. 1, for example, the upper limit of the cursor speed curve 100a may be moved from 180 pixels/sec to 200 pixels/sec (e.g., as illustrated by cursor speed curve 100a'). Thus, if the cursor speed curve 100a is associated with the first level of the game and is modified to be like the cursor speed curve 100a', then the modified (or updated) version of the cursor speed curve 100a (e.g., 100a') may be used during subsequent play of the first level of the game such that the on-screen cursor moves at a rate of about 200 pixels/sec for a joystick tilt above about 27° (e.g., about 27° to 90° of tilt) during subsequent play of the first level of the game. Similar modifications can be made to the other speed curves of the local cursor movement profile 312'. Moreover, such modifications can be made over time such that the speed curves 100 of the local cursor movement profile 312' iteratively adjust (or adapt) to the desires of the user (or users) 334 of the client device 304. That is, a local cursor movement profile 312' can include one or more heuristic cursor speed curves 100 that adapt based on use of the respective one or more cursor speed curves 100.

In some embodiments, a cursor speed curve 100 of the master cursor movement profile 312 can be modified based on adjustments to the corresponding speed curves 100 of the corresponding local cursor movement profiles 312'. For example, if the usage data 406 for the gaming application includes local cursor movement profiles 312' from multiple client devices 304 associated with play of the game by multiple different users 334, and the average maximum speed for the speed curves 100a of the local cursor movement profiles 312' received is about 200 pixels/sec for a joystick tilt above about 27° (e.g., about 27° to 90° of tilt), then the upper limit of the cursor speed curve 100a of the master cursor movement profile 312 may be moved from 180 pixels/sec to 200 pixels/sec (e.g., as illustrated by cursor speed curve 100a'). Thus, subsequent copies of the master cursor movement profile 312 may include the modified version of the speed curve 100a (e.g., the cursor speed curve 100a'). Similar modifications can be made to the other speed curves 100 of the master cursor movement profile 312. Moreover, such modifications can be made over time such that the speed curves 100 of the master cursor movement profile 312 iteratively adjust (or adapt) to the desires of the user (or users) 334 of the client device 304. That is, the master cursor movement profile 312 can include one or more heuristic cursor speed curves 100 that adapt based on use of the respective one or more cursor speed curves 100.

Figure 5:
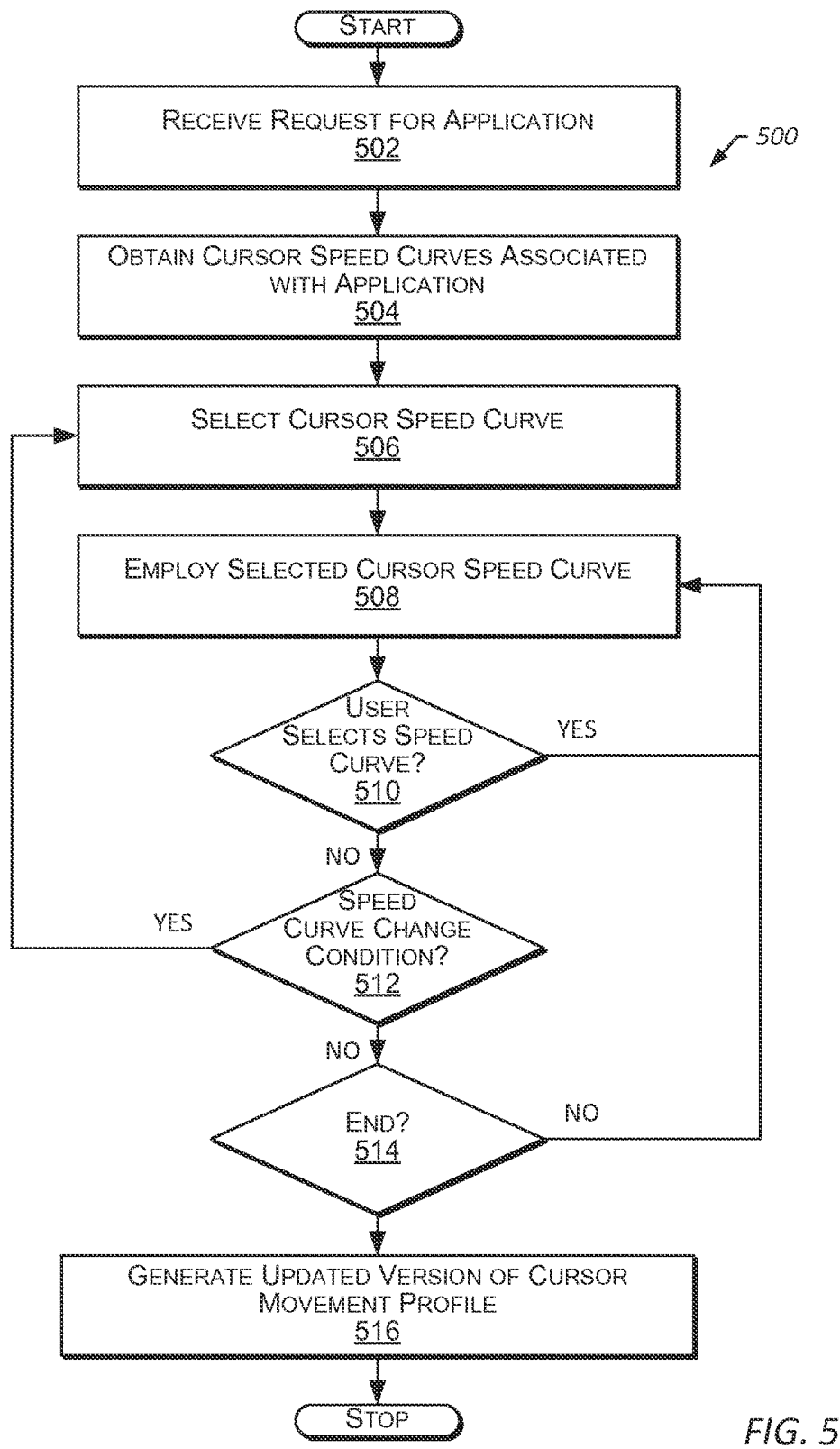
FIG. 5 is a flowchart that illustrates an example method of employing cursor movement profiles in accordance with one or more embodiments.

FIG. 5 is a flow diagram that illustrates a method 500 of employing cursor movement profiles in accordance with one or more embodiments. The method 500 may generally include receiving a request for an application (block 502), obtaining one or more cursor speed curves associated with the requested application (block 504), selecting a cursor speed curve (block 506), and employing the selected cursor speed curve (block 508). In some embodiments, the method 500 can include determining whether a user has selected (e.g., manually selected) a different cursor speed curve (block 510) and, in response to determining that a user has selected a different cursor speed curve, employing the user selected cursor speed curve (block 508). In some embodiments, the method 500 can include determining whether a cursor speed curve change condition exists (block 512) and, in response to determining that a cursor speed curve change condition exists, selecting a cursor speed curve (e.g., based on the current conditions) (block 506) and employing the selected cursor speed curve (block 508). In some embodiments, the method 500 includes generating an updated (or current) version of the cursor movement profile (block 516).

In some embodiments, receiving a request for an application (block 502) can include receiving a user request to use or otherwise access an application. For example, a user 334 may select to download, open or otherwise access a gaming application 314 using his or her client device 304. The gaming application 314 may include a game played using a joystick-type user input device 308.

In some embodiments, obtaining one or more cursor speed curves associated with the requested application (block 504) can include the client device 304 querying the application server 302 for a copy of the application 314 and/or a copy of the cursor movement profile 312 associated with the application 314. For example, in response to a user request to download, open or otherwise access a gaming application 314, the client device 304 may send a corresponding application request 402 to the application server 302. In response to receiving the application request 402, the application server 302 may identify the application 314 corresponding to the request 402 and/or the current version of the master cursor movement profile 312 (e.g., stored in the data store 310) corresponding to the application 314. The cursor movement profile 312 may include, for example, one or more cursor speed curves 100 (e.g., cursor speed curves 100a, 100b and 100c). In some embodiments, the cursor movement profile 312 may specify conditions associated with each of the cursor speed curves 100, such as what modes of the application 314 the cursor speed curves 100 are to be used with (e.g., default speed curves 100 for various modes of the application 314). The application server 302 may serve, or otherwise transmit, to the client device 304, a copy of the application 314 and/or the current version of the master cursor movement profile 312 corresponding to the application 314. The client device 304 may store a copy of the application 314 and/or the corresponding cursor movement profile 312 locally (e.g., as the local application 314' and the local cursor movement profile 312'). Continuing with the above example of a gaming application played using a joystick, the application 314 may include the game software itself. The cursor movement profile 312 may include a cursor movement profile 312 for use in converting user manipulation of the joystick to on-screen cursor movements during play of the game. The master cursor movement profile 312 for the game may specify that the speed curves 100a, 100b and 100c are default curves to be used with the first, second and third levels, respectively, of the game.

In some embodiments, selecting an initial cursor speed curve (block 506) can include selecting a particular speed curve 100 of the local cursor movement profile 312' associated with the current mode, or other conditions, relating to the use of the application 314' on the client device 304. Continuing with the above example of a gaming application, selecting an initial cursor speed curve may include the client device 304 selecting one of the speed curves 100a, 100b and 100c of the local cursor movement profile 312' associated with the gaming application. In some embodiments, an initial cursor speed curve selection can be based on one or more conditions, such as a default cursor speed curve for the application, a mode of the application, a user's demographic profile, a user's preferences, a user's historic behavior, and/or the like.

With regard to a default cursor speed curve for the application, for example, if it is determined that the application 314' is associated with a default cursor speed curve 100, then selecting an initial cursor speed curve may include selecting the default cursor speed curve 100. Continuing with the above example, if the local cursor movement profile 312' specifies or it is otherwise determined that the cursor speed curve 100a is a default cursor speed curve for the gaming application 314', then selecting an initial cursor movement profile may include selecting the cursor speed curve 100a of the local cursor movement profile 312'.

With regard to a mode of the application, for example, if it is determined that the application 314' is to be operated in a given mode associated with a given cursor speed curve 100, then selecting an initial cursor speed curve may include selecting the cursor speed curve 100 associated with the mode. Continuing with the above example, if the local cursor movement profile 312' specifies or it is otherwise determined that the cursor speed curve 100a is a default speed curve 100 for the first level of the gaming application 314', and the first level of the application 314' is to be played initially, then selecting an initial cursor speed curve may include selecting the cursor speed curve 100a of the cursor movement profile 312'.

With regard to a user's demographic profile, for example, if it is determined that the requesting user 334 is associated with a set of demographics (e.g., male, intermediate skill level, 25 years old, and/or the like), then selecting an initial cursor speed curve may include selecting the cursor speed curve 100 associated with the demographics of the user 334. Continuing with the above example, if it is determined that demographic information associated with the user 334 requesting to play the game indicates that the user 334 is male, of advanced skill level and 25 years old, and the local cursor movement profile 312' specifies or it is otherwise determined that the first, second and third cursor speed curves 100a, 100b and 100c of the cursor movement profile 312' are associated with advanced, intermediate and beginner skill levels, respectively, then selecting an initial cursor speed curve may include selecting the first cursor speed curve 100a of the cursor movement profile 312'. In some embodiments, the user 334 may be identified based on user-submitted credentials (e.g., log-on information submitted when logging-in to the client device 304), and a set of demographic information (e.g., a user profile stored on the client device 304) associated with the user 334.

With regard to a user's preferences, for example, if it is determined that the requesting user 334 is associated with a set of preferences indicative of a preferred cursor speed curve 100, then selecting an initial cursor speed curve may include selecting the preferred cursor speed curve 100. Continuing with the above example, if the local cursor movement profile 312' specifies or it is otherwise determined that preference information associated with the user 334 requesting to play the game indicates that the user 334 previously set a preference electing to use the first cursor speed curve 100a with the gaming application 314', then selecting an initial cursor speed curve may include selecting the first cursor speed curve 100a. In some embodiments, the user 334 may be identified based on user-submitted credentials (e.g., log-on information submitted when logging-in to the client device 304), and a set of preference information (e.g., a user profile stored on the client device 304) associated with the user 334.

With regard to a user's historic behavior, for example, if it is determined that a user 334 typically interacts in manner that is consistent with use of a particular type of speed curve 100 (e.g., the user 334 typically selects a more sensitive speed curve 100 or a less sensitive speed curve 100), it can be determined that the user 334 prefers speed curves 100 of the particular type, and selecting an initial cursor speed curve may include selecting a cursor speed curve 100 of the type preferred by the user 334. In some embodiments, past interactions may include how a user interacts with or otherwise uses a user input device. If, for example, the monitored user input data 404 indicates, for example, that the user 334 tilts his or her joystick to its limits for a threshold percentage of the time (e.g., during 50% of the time or more), indicating that user 334 typically wants the on-screen cursor to move faster, then it may be determined that the user prefers to use more sensitive speed curves. In some embodiments, past interactions may include past speed curve selections by a user. If, for example, the user 334 selects to use a less-sensitive speed curves 100 at least a threshold percentage of the time (e.g., 75% or more of the manual selections by the user 334 to change speed curves 100 includes changing to a less sensitive speed curve 100), indicating that user 334 typically wants the on-screen cursor to move in a less-sensitive manner, then it may be determined that the user prefers to use less sensitive speed curves 100. Continuing with the above example, if the user's past interactions indicate that the user 334 selects to use less sensitive speed curves 100 more than 50% of the time, whether it be with the gaming application 314' or other applications, it may be determined that the user 334 prefers to use less sensitive speed curves 100. Thus, if the cursor speed curve 100a is a default speed curve 100 for the first level of the gaming application 314', and the first level of the application 314' is to be played initially, then selecting an initial cursor speed curve may include selecting the moderately sensitive cursor speed curve 100b of the cursor movement profile 312' as opposed to selecting the default speed curve 100a of the cursor movement profile 312'. That is, the moderately sensitive speed curve 100b may be selected as opposed to the highly-sensitive speed curve 100a based at least in part on the user's historic behavior.

In some embodiments, employing the selected cursor speed curve (block 508) can include executing the requested application 314' with the selected cursor speed curve 100 such that user commands to move a cursor are mapped to on-screen cursor movements using the selected cursor speed curve 100. Continuing with the above example, if the first cursor speed curve 100a is selected and the user 334 is using a joystick-type user input device 308 to interact with the gaming application 314', then employing the selected cursor speed curve may include the client device 304 presenting the first level of the gaming application 314', and using the first cursor speed curve 100a to map the positions of the joystick user input device 308 to corresponding on-screen cursor movements during play of the first level of the gaming application 314'. That is, the resulting on-screen cursor movements may be determined by mapping the positions of the joystick to on-screen cursor movements using the first cursor speed curve 100a. For example, if the highly sensitive cursor speed curve 100a of FIG. 1 is selected and the user 334 tilts the joystick at 45° in the upward direction, then the on-screen cursor may move upward at a rate of about 180 pixels/sec.

In some embodiments, determining whether a user has selected a different cursor speed curve (block 510) can include determining whether the user has indicated a desire to change from the currently selected cursor speed curve 100 to a different cursor speed curve 100. Continuing with the above example, it may be determined that the user 334 has selected a different cursor speed curve if, for example, the first cursor speed curve 100*a* is currently being used and the user 334 selects, or otherwise indicates a desire, to use the second cursor speed curve 100*b*. Such a selection can be made, for example, by a selection on the user input device 308 and/or a selection in the settings of the application 314'. With regard to a selection on the user input device 308, for example, the user input device 308 may include a joystick with one or more buttons that can be selected to change between cursor speed curves 100, and the user 334 may use the buttons to select, or otherwise indicate a desire to change to, the second cursor speed curve 100*b*. With regard to a selection in the settings of the application 314', for example, the application 314' may include a settings menu that displays a listing of different speed curves 100, and enables a user to select a cursor speed curve 100 to be used from the listing. The user 334 may use the settings menu to select the second cursor speed curve 100*b*. For example, the user 334 may use the user input device 308 to select to open a menu displaying the listing of speed curves 100, the user 334 may, then, use the user input device 308 to move an on-screen cursor over one of the speed curves 100 of the listing of speed curves 100 (e.g., move the cursor up and down the list) and depress a selection button of the user device 108 while the cursor is located over one of the speed curves 100 of the listing to select that speed curve 100.

In some embodiments, in response to determining that a user has selected a different cursor speed curve 100, the method 500 can proceed to employing the user-selected cursor speed curve (block 508). Continuing with the above example, if the user 334 has selected to use the second cursor speed curve 100*b* during play of the first level of the gaming application 314' and the user 334 is using a joystick user input device 308 to interact with the gaming application 314', then employing the selected cursor speed curve 100 may include presenting the first level of the gaming application 314', and using the second cursor speed curve 100*b* to map the positions of the joystick user input device 308 to corresponding on-screen cursor movements. For example, if the second cursor speed curve 100*b* is selected and the user 334 tilts the joystick at 45° in the upward direction, then the on-screen cursor may move upward at a rate of about 175 pixels/sec. Accordingly, employing the selected cursor speed curve may include monitoring of the application 314 (e.g., user input data 404) for cursor movement requests and moving an on-screen cursor in accordance with the movement requests and the user-selected cursor speed curve 100*b*. Such a selection process can be repeated to enable the user 334 to select different cursor speed curves 100 while interacting with the application 314'. In some embodiments, this user selection functionality may not be available. For example, if a user 334 is playing a level of a gaming application 314 that requires use of a particular cursor speed curve 100, then the user 334 may not be allowed to select another cursor speed curve 100 during play of the level.

In some embodiments, determining whether a cursor speed curve change condition (or "change condition") exists (block 512) includes determining whether a predetermined condition (e.g., indicative of a potential need to change from the currently selected cursor speed curve 100 to a different cursor speed curve 100) exists. In some embodiments, a change condition may include a change from one application mode to another, a behavior exhibited by the user, a location of cursor activity, and/or the like. In some embodiments, in response to determining that a change condition exists, the method 500 may proceed to programmatically (or automatically) select a cursor speed curve (e.g., based on the current conditions) (block 506). In some embodiments, the selection of a cursor speed curve may include the same or similar considerations and selections as those described above with regard to selecting an initial cursor speed curve (e.g., at block 506), using the current conditions. In some embodiments, a cursor speed curve 100 can be selected based on one or more conditions, such as a default cursor speed curve for the current mode of the application, user behavior, a location of the cursor activity, and/or the like.

With regard to a change from one application mode to another, for example, if the application changes from a first mode that is consistent with, or otherwise associated with, the use of the currently selected cursor speed curve 100, to a second mode that is not consistent with, or otherwise associated with, the use of the currently selected cursor speed curve 100, then it may be determined that a change condition exists. Continuing with the above example, if the first cursor speed curve 100*a* is currently selected and being used during play of the first level of the gaming application 314' (e.g., the cursor movement profile 312' specifies that the cursor speed curve 100*a* is the default speed curve 100 for the first level of the gaming application 314'), and the user completes the first level such that the gaming application 314' proceeds to a second level which the local cursor movement profile 312' associates with the second cursor speed curve 100*b* (e.g., the cursor movement profile 312' specifies that the cursor speed curve 100*b* is the default speed curve 100 for the second level of the gaming application 314'), then it may be determined that a change condition exists. In such an embodiment, the second cursor speed curve 100*b* may be selected (e.g., at block 506).

With regard to a condition, including a behavior exhibited by the user, for example, if a user's behavior includes a set of recent cursor movements (e.g., cursor movements in the last minute, or the last ten movements) that are not consistent with, or otherwise associated with, the currently selected cursor speed curve 100, then it may be determined that a change condition exists. Continuing with the above example, if the speed curve 100*a* is currently selected and being used by the gaming application 314', and the user 334 continues to tilt the joystick slightly (e.g., indicating that the user wants the on-screen cursor to move slower), and these types of movements are determined to be consistent with, or otherwise associated with, a less sensitive cursor speed curve 100, then it may be determined that a change condition exists. In such an embodiment, the less sensitive cursor speed curve 100*b* may be selected (e.g., at block 506). As another example, if the first cursor speed curve 100*a* is currently selected and being used by the application 314', and the user 334 continues to make several cursor movements (e.g., more than a threshold number of cursor movements, such as three or more movements) before settling on or otherwise selecting a location or region of the screen, (e.g., indicating that the currently employed cursor speed curve 100*a* is too sensitive), then it may be determined that a change condition exists. In such an embodiment, the less sensitive cursor speed curve 100*b* may be selected (e.g., at block 506).

With regard to a location of cursor activity, for example, if the on-screen cursor is positioned at or near an on-screen region or location that is not consistent with, or otherwise not associated with, the use of the currently selected cursor speed curve 100, then it may be determined that a change condition exists. Continuing with the above example, if the first cursor speed curve 100*a* is currently selected and being used during play of the gaming application 314', and the user is moving the cursor in a first region of the display that is associated with the first cursor speed curve 100a, but the user moves the on-screen cursor into or near a second region of the display that is associated with the second cursor speed curve 100b, then it may be determined that a change condition exists. In such an embodiment, the second cursor speed curve 100b may be selected (e.g., at block 506) (e.g., based on the on-screen cursor being located in or near the second region associated with the second cursor speed curve 100b). Such an embodiment may be particularly useful if, for example, different portions of the display require different types of movements. For example, if the first region does not require precise movement, then the highly sensitive cursor speed curve 100a may be better suited than the moderately sensitive cursor speed curve 100b for controlling on-screen cursor movements in the first region. However, if the second region does require precise movements, then the second cursor speed curve 100b may be better suited than the first cursor speed curve 100a for controlling on-screen cursor movements in the second region.

In some embodiments, a determination of whether an on-screen cursor is positioned at or near an on-screen region or location may be based on the cursor's relative position. For example, if a position is represented by a given pixel address (e.g., pixel address of (100,100)), it may be determined that an on-screen cursor is near the position if it is located within a threshold distance (e.g., 50 pixels) of the pixel address. That is for example, an on screen cursor may be determined to be near the pixel address of (100,100) if it is located within 50 pixels of the pixel address of (100,100). If the second speed curve 100b is associated with the pixel address of (100,100), then the second speed curve 100b may be selected in response to the cursor being moved within 50 pixels of the pixel address of (100,100). If, for example, a region is represented by a boundary (e.g., a square region defined by pixel addresses of (75,75), (75, 125), (125,125), and (125, 75)), it may be determined that an on-screen cursor is at or near the region if it is located within the bounded region or within a threshold distance of the boundary of the region. That is for example, an on screen cursor located at the pixel address of (100,100) may be determined to be within the square region defined by pixel addresses of (75,75), (75, 125), (125,125), and (125, 75). If the second speed curve 100b is associated with the square region, then the second speed curve 100b may be selected in response to the cursor being moved within the bounds of the square region and/or being moved within a threshold distance of the bounds of the square region.

In some embodiments, the method 500 includes generating a current (or updated) version of the cursor movement profile (block 516) (e.g., if the user elects to end the application) (e.g., block 514). The current version of the local cursor movement profile 312' may reflect the current selections or recent uses of speed curves 100 with the application 314'. For example, if the initial version of the local cursor movement profile 312' (e.g., the locally stored copy of the master cursor movement profile 312) received from the server 302 specifies that the cursor speed curves 100a, 100b and 100c are "default" speed curves 100 for use with the first and second levels, respectively, of the game, and during play of the game, the user 334 manually selects to use the cursor speed curve 100c for play of the first level, and the cursor speed curve 100a is programmatically selected for use during play of the second level of the game, and the user 334 plays the third level using the cursor speed curve 100c, then the client device 304 may update the local cursor movement profile 312' to specify that the cursor speed curves 100c, 100a and 100c are the selected (e.g., default) speed curves 100 for use with the first, second and third levels, respectively, of the game. In some embodiments, the client device 304 may forward the current (or updated) version of the cursor movement profile 312' to the application server 302. As described herein, the application server 302 may use the cursor movement profile 312' received from different users 334 and client devices 304 to update or otherwise modify the master cursor movement profile 312. In some embodiments, the cursor movement profile 312' may be updated at other times during the process, such as in response to a selection of a cursor speed curve (e.g., after selection of a cursor speed curve at block 506).

In some embodiments, generating a current (or updated) version of the cursor movement profile (block 516) can include modifying one or more characteristics of one or more cursor speed curves 100 of the cursor movement profile 312' based on historical user interactions. For example, if monitoring behavioral data during a user's interaction with an application 314' while using a speed curve 100 reveals that the user 334 is predisposed to some behavior, then the cursor speed curve 100 may be modified to account for the user's behavior. If the monitored user input data 404 received while the user 334 is playing the gaming application 314' using a speed curve 100a of the local cursor movement profile 312' indicates, for example, that the user 334 tilts his or her joystick to its limits for a threshold percentage of the time (e.g., during 50% of the play or more), indicating that user 334 wants the on-screen cursor to move faster while playing the game, then the cursor speed curve 100a may be modified to provide for faster cursor movements. With regard to the first cursor speed curve 100a of FIG. 1, for example, the upper limit of the cursor speed curve 100a may be moved from 180 pixels/sec to 200 pixels/sec (e.g., as illustrated by cursor speed curve 100a'). Thus, if the cursor speed curve 100a is associated with the first level of the game and is modified to be like the cursor speed curve 100a', then the modified (or updated) version of the cursor speed curve 100a (e.g., 100a') may be used during subsequent play of the first level of the game such that the on-screen cursor moves at a rate of about 200 pixels/sec for a joystick tilt above about 27° (e.g., about 27° to 90° of tilt) during subsequent play of the first level of the game. Similar modifications can be made to the other speed curves 100 of the local cursor movement profile 312'. Moreover, such modifications can be made over time such that the speed curves 100 of the local cursor movement profile 312' iteratively adjust (or adapt) to the desires of the user (or users) 334 of the client device 304. That is, a local cursor movement profile 312' can include one or more heuristic cursor speed curves 100 that adapt based on use of the respective one or more cursor speed curves 100.

Figure 6:
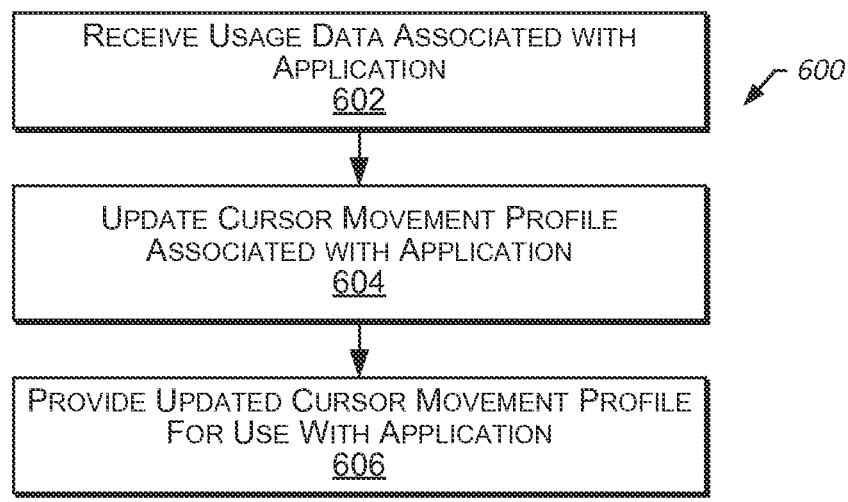
FIG. 6 is a flowchart that illustrates an example method of updating cursor movement profiles in accordance with one or more embodiments.

FIG. 6 is a flow diagram that illustrates a method 600 of updating a cursor movement profile in accordance with one or more embodiments. Method 600 may generally include receiving usage data associated with an application (block 602), updating the cursor movement profile for the application (e.g., based on the usage data associated with the application) (block 604), and providing the updated cursor movement profile for use with the application (block 606).

In some embodiments, receiving usage data associated with an application (block 602) can include receiving usage data 406 associated with an application 314. For example, the server 302 may receive, from one or more client devices 304, usage data 406 associated with the application 314. The usage data 406 received from a client device 304 may include, for example, data including or otherwise indicating that the user input data 404 received by the client device 304 is indicative of user interactions with a local version of the application 314', and the current (or updated) version of the local cursor movement profile 312' (e.g., including the currently selected cursor speed curves 100 for the application 314' and/or the various modes of the application 314') stored on the client device 304. The usage data 406 may be transmitted to the application server 302 on a regular basis (e.g., daily, weekly, monthly, and/or the like) and/or in response to a triggering event (e.g., in response to a user exiting the application 314').

In some embodiments, updating the cursor movement profile associated with the application (block 604) can include updating the master cursor movement profile 312 associated with the application 314 based on the received usage data 406 associated with the application 314. In some embodiments, the usage data 406 can be used by the application server 302 to update the cursor movement profile 312 associated with the application 314. For example, the application server 302 may select which cursor speed curves 100 are included with the master cursor movement profile 312 for the application 314 and/or which cursor speed curves 100 of the master cursor movement profile 312 are associated with the various modes of the application 314 based on the received usage data 406 associated with the application 314. Continuing with the above example of a game, if the usage data 406 received from multiple users 334 (e.g., received from multiple different client devices 304) includes multiple updated local cursor movement profiles 312', and in the majority of those local cursor movement profiles 312' the cursor speed curve 100c is associated with the first level of the game (e.g., is selected as the default for the first level of the game), then the master cursor movement profile 312 may be updated (or otherwise modified) to specify that the cursor speed curve 100c is the default speed curve 100 for use with the first level of the game.

In some embodiments, updating the cursor movement profile associated with the application (block 604) can include modifying one or more characteristics of one or more cursor speed curves 100 of the cursor movement profile 312 based on adjustments to the corresponding speed curves 100 of the corresponding local cursor movement profiles 312'. For example, if the usage data 406 for the gaming application includes local cursor movement profiles 312' from multiple client devices 304 associated with play of the game by multiple different users 334, and the average maximum speed for the speed curves 100a of the local cursor movement profiles 312' received is about 200 pixels/sec for a joystick tilt above about 27° (e.g., about 27° to 90° of tilt), then the upper limit of the cursor speed curve 100a of the master cursor movement profile 312 may be moved from 180 pixels/sec to 200 pixels/sec (e.g., as illustrated by cursor speed curve 100a'). Thus, subsequent copies of the master cursor movement profile 312 may include the modified version of the speed curve 100a (e.g., the cursor speed curve 100a'). Similar modifications can be made to the other speed curves 100 of the master cursor movement profile 312. Moreover, such modifications can be made over time such that the speed curves 100 of the master cursor movement profile 312 iteratively adjust (or adapt) to the desires of the user (or users) 334 of the client device 304. That is, the master cursor movement profile 312 can include one or more heuristic cursor speed curves 100 that adapt based on use of the respective one or more cursor speed curves 100. In some embodiments, the modification of a cursor movement profile can continue as new usage data 406 is received. Accordingly, in some embodiments, a master cursor movement profile 312 can be iteratively modified or updated based on usage data 406. Such modifications and updates may enable the master cursor movement profile 312 to dynamically adapt the way the cursor movement profile 312 is being used by one or more users 334.

In some embodiments, providing the updated cursor movement profile for use with the application (block 606) can include providing a copy of the updated master cursor movement profile 312 associated with the application 314 for subsequent use with the application 314. For example, if the application server 302 subsequently receives, from a client device 304, a request 402 for an application 314, then the application server 302 may serve, to the requesting client device 304, a copy of the master application 314 and the updated master cursor movement profile 312. Continuing with the above example of a game, if the application server 302 subsequently receives, from a client device 304, a request 402 for the game, then the application server 302 may serve, to the requesting client device 304, a copy of the game and the updated master cursor movement profile 312 that specifies that the cursor speed curve 100c is the default speed curve 100 for use with the first level of the game.

In some embodiments, the copy of the cursor movement profile 312 that is provided to the client device 304 can be customized based at least in part on the user 334 that is expected to use the cursor movement profile 312. For example, if it is determined that the user 334 of a client device 304 typically interacts in manner that is consistent with use of a particular type of speed curve 100 (e.g., the user 334 typically selects a more sensitive speed curve 100 or a less sensitive speed curve 100), it can be determined that the user 334 prefers speed curves 100 of the particular type, and one or more speed curves 100 of the type can be added to the copy of the cursor movement profile 312 that is provided to the client device 304. Continuing with the above example, if the usage data 406 indicates that the user 334 selects to use less sensitive speed curves 100 more than 50% of the time, whether it be with the gaming application 314' or other applications, it may be determined that the user 334 prefers to use less sensitive speed curves 100. Thus, if the cursor movement profile 312 includes the speed curves 100a, 100b and 100c, a less sensitive cursor speed profile 100 (e.g., a fourth speed curve 100 that is less sensitive than the speed curves 100a, 100b and 100c) can be added to the copy of the cursor movement profile 312 that is provided to the client device 304. Similarly, if the usage data 406 indicates that the user 334 selects to use more sensitive speed curves 100 more than 50% of the time, whether it be with the gaming application 314' or other applications, it may be determined that the user 334 prefers to use sensitive speed curves 100. Thus, if the cursor movement profile 312 includes the speed curves 100a, 100b and 100c, a more sensitive cursor speed curve 100 (e.g., a fourth speed curve 100 that is more sensitive than the speed curves 100a, 100b and 100c) can be added to the copy of the cursor movement profile 312 that is provided to the client device 304.

In some embodiments, the server 302 may programmatically (or automatically) provide copies of updated cursor movement profiles 312 to the client devices 304. For example, the server 302 may push copies of the updated cursor movement profile 312 to the client devices 304 that already have the corresponding application 314. The updated cursor movement profiles 312 may be pushed to client devices 304 on a regular basis (e.g., daily, weekly, monthly, and/or the like) and/or in response to a triggering event (e.g., in response to the server 302 updating the cursor movement profiles 312). Continuing with the above example, the server 302 may push a copy of the updated cursor movement profile 312 (e.g., that specifies that the cursor speed curve 100c is the default speed curve 100 for use with the first level of the game) to the client devices 304 that have previously downloaded the game. The client devices 304 may use the copy of the updated master cursor movement profile 312 to update their local cursor movement profiles 312' for the game, as described herein. For example, in some embodiments, the client device 304 may use the copy of the updated master cursor movement profile 312 to update only the portions of the local cursor movement profile 312' that have not already been used or modified. Continuing with the above example, if the user 334 has played levels one and two of the game, and the copy of the updated cursor movement profile 312 has changed the default cursor speed curve 100 for the second level of the game from curve 100b to curve 100a, and changed the default cursor speed curve 100 for the third level of the game from curve 100c to curve 100a, then the local cursor movement profile 312' may be updated to specify that the cursor speed curve 100a is associated with the third level of the game (e.g., based on the updated master cursor movement profiles 312 changing the default cursor speed curve 100 for the third level of the game from curve 100c to curve 100a), but the cursor speed curve 100b may remain associated with the second level of the game in the local cursor movement profile 312' (e.g., based on the user 334 having already played that level using the cursor speed curve 100b). In some embodiments, the client device 304 may use the copy of the updated master cursor movement profile 312 to update the local cursor movement profile 312'. For example, the updated cursor movement profile 312 may replace the current local cursor movement profile 312' stored on the client device 304. Thus, the local cursor movement profiles 312' may be updated based on updates to the master cursor movement profile 312.

It will be appreciated that the methods 500 and 600 are exemplary embodiments of methods that may be employed in accordance with the techniques described herein. The methods 500 and 600 may be modified to facilitate variations of their implementation and use. The order of the methods 500 and 600 and the operations provided therein may be changed, and various elements may be added, reordered, combined, omitted, modified, etc. Portions of the methods 500 and 600 may be implemented in software, hardware, or a combination thereof. Some or all of the portions of the methods 500 and 600 may be implemented by one or more of the processors/modules/applications described herein.

Figure 7:
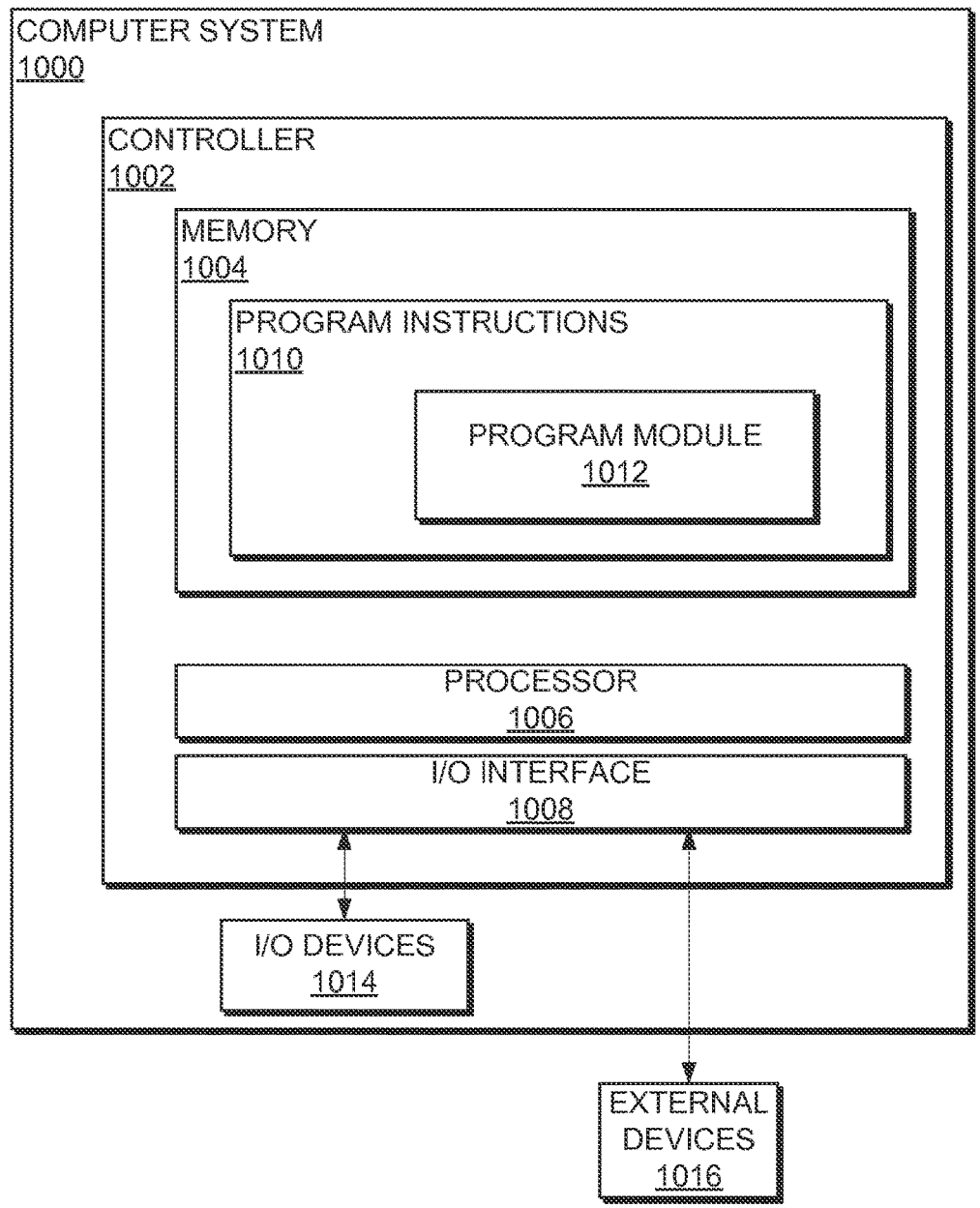
FIG. 7 is a diagram that illustrates an exemplary computer system in accordance with one or more embodiments.

FIG. 7 is a diagram that illustrates an exemplary computer system 1000 in accordance with one or more embodiments. In some embodiments, the computer system 1000 includes a controller 1002 for controlling the operational aspects of the computer system 1000. In some embodiments, the controller 1002 includes a memory 1004, a processor 1006, and an input/output (I/O) interface 1008. The memory 1004 may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The program instructions 1010 may include program modules 1012 (e.g., including subsets of program instructions 1010) that are executable by a computer processor (e.g., the processor 1006) to cause the functional operations (e.g., methods/routines/processes) described herein, including those described with regard to the methods 500 and 600. The program instructions 1010 may include, for example, program modules 1012 including an application management module 320a and/or an application module 320b. The processor 1006 may be any suitable processor capable of executing/performing program instructions. The processor 1006 may include a central processing unit (CPU) that carries out program instructions (e.g., program instructions of the program module(s) 1012) to perform arithmetical, logical, and input/output operations described herein. The processor 1006 may include one or more processors. The I/O interface 1008 may provide an interface for communication with one or more I/O devices 1014, such as a joystick, a computer mouse, a keyboard, a touch screen, a graphical user interface (GUI) (e.g., a display), and/or the like. The I/O devices 1014 may include one or more of the user input devices 308. A display may include a suitable electronic display. Devices may be connected to the I/O interface 1008 via a wired or a wireless connection. The I/O interface 1008 may provide an interface for communication with one or more external devices 1016, such as other computers, networks and/or the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. As used throughout this application, the term "from" does not limit the associated operation to being directly from. Thus, for example, receiving an item "from" an entity may include receiving an item directly from the entity or indirectly from the entity (e.g., via an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method of moving an on-screen cursor, the method comprising:
   receiving a user request to play a gaming application, wherein the user request to play of the gaming application is received from a user input device;
   receiving, from an application server, a cursor movement profile comprising a plurality of cursor speed curves, wherein each of the cursor speed curves maps inputs provided via the user input device to a corresponding movement speed of the on-screen cursor;
   receiving, from the user input device, a first user input indicative of a first requested movement of the on-screen cursor;
   moving the on-screen cursor from a first position to a second position in accordance with a first cursor continuous speed curve from the plurality speed curves and the first requested movement of the on-screen cursor;
   selecting a second continuous cursor speed curve from the plurality of cursor speed curves, the second continuous cursor speed curve comprising a first portion with a constant cursor movement speed for a first range of two or more input values to the user input device and a second portion with a variable cursor movement speed over a second range of two or more input values to the user input device;
   receiving, from the user input device, a second user input indicative of a second requested movement of the on-screen cursor;
   moving the on-screen cursor from a third position to a fourth position in accordance with the second cursor continuous speed curve and the second requested movement of the on-screen cursor;
   generating an updated cursor movement profile indicating selection of the second cursor continuous speed curve; and
   transmitting, to the application server, the updated cursor movement profile.

2. The method of claim 1, wherein the user input device comprises a joystick, and wherein at least one of the cursor speed curves maps angles of tilt of the joystick to a corresponding speed of on-screen cursor movements such that the on-screen cursor of the gaming application moves on-screen at a rate that corresponds to an angle of tilt of the joystick.

3. The method of claim 1, wherein the method further comprises displaying a listing of cursor speed curves, and wherein selecting a second continuous cursor speed curve of the plurality of cursor speed curves comprises selecting the second continuous cursor speed curve in response to receiving user selection of one of the cursor speed curves from the displayed listing of cursor speed curves.

4. The method of claim 1, wherein selecting a second continuous cursor speed curve of the plurality of cursor speed curves comprises programmatically selecting the second continuous cursor speed curve in response to determining that at least one or more of a mode of the gaming application, a demographic profile of a user associated with the gaming application, a preference of a user associated with the gaming application, or historic behavior of a user associated with the gaming application corresponds to the second cursor continuous speed curve.

5. A method, comprising:
   receiving a plurality of response speed profiles associated with an application;
   selecting a first continuous response speed profile from the plurality of response speed profiles;
   providing instructions that cause rendering of an on-screen display based at least in part on the first continuous response speed profile;
   determining that a response speed profile change condition exists;
   selecting a second continuous response speed profile from the plurality of response speed profiles, the second continuous response speed profile comprising at least a first portion with a constant cursor movement speed for a first range of two or more input values to the user input device and a second portion with a variable cursor movement speed over a second range of two or more input values to the user input device; and
   providing instructions that cause rendering of an on-screen display based at least in part on the second continuous response speed profile.

6. The method of claim 5, wherein receiving a plurality of response speed profiles associated with an application comprises receiving a response movement profile comprising a plurality of response speed profiles, and wherein each of the response speed profiles associates inputs provided via a user input device to a corresponding movement speed of an element of the on-screen display.

7. The method of claim 6, wherein the response movement profile is received from a server, and the method further comprising:
   generating an updated response movement profile indicating selection of the second continuous response speed profile; and
   providing the updated response movement profile to the server, wherein the server is configured to update a master response movement profile using the updated response movement profile.

8. The method of claim 5, wherein causing rendering of an on-screen display based at least in part on a response speed profile comprises:
   receiving data indicative of a requested movement of an on-screen element of the application;
   determining, using a currently selected response speed profile, an element movement corresponding to the requested movement of an on-screen element; and
   causing the on-screen element of the application to move in accordance with the element movement determined.

9. The method of claim 5, wherein at least one of the response speed profiles of the plurality of response speed profiles comprises a cursor speed profile.

10. The method of claim 5, wherein selecting the first continuous response speed profile from the plurality of response speed profiles comprises selecting a default response speed profile for the application.

11. The method of claim 5, wherein selecting the first continuous response speed profile from the plurality of response speed profiles comprises selecting a user-selected response speed profile.

12. The method of claim 5, wherein selecting the first continuous response speed profile from the plurality of response speed profiles comprises selecting a response speed profile that is associated with a current mode of the application.

13. The method of claim 5, wherein determining that a response speed profile change condition exists comprises identifying a change from a first mode of the application to a second mode of the application.

14. The method of claim 5, wherein determining that a response speed profile change condition exists comprises determining that a set of cursor movements corresponds to the second continuous response speed profile.

15. The method of claim 5, wherein determining that a response speed profile change condition exists comprises determining that an on-screen cursor of the application is positioned at or near an on-screen region that is associated with the second speed profile.

16. A system, comprising:
a processor; and
a memory comprising program instructions stored thereon that are executable by the processor to cause:
receiving a plurality of response speed profiles associated with an application;
selecting a first continuous response speed profile from the plurality of response speed profiles;
providing instructions that cause rendering of an on-screen display based at least in part on the first continuous response speed profile;
determining that a response speed profile change condition exists;
selecting a second continuous response speed profile from the plurality of response speed profiles, the second continuous response speed profile comprising at least a first portion with a constant cursor movement speed for a first range of two or more input values to the user input device and a second portion with a variable cursor movement speed over a second range of two or more input values to the user input device; and
providing instructions that cause rendering of an on-screen display based at least in part on the second continuous response speed profile.

17. The system of claim 16, wherein receiving a plurality of response speed profiles associated with an application comprises receiving a response movement profile comprising a plurality of response speed profiles, and wherein each of the response speed profiles associates inputs provided via a user input device to a corresponding movement speed of an element of the on-screen display.

18. The system of claim 17, wherein the response movement profile is obtained from a server, and the instructions are further executable by the processor to cause:
generating an updated response movement profile indicating selection of the second continuous response speed profile; and
providing the updated response movement profile to the server, wherein the server is configured to update a master response movement profile using the updated response movement profile.

19. The system of claim 16, wherein selecting the first continuous response speed profile from the plurality of response speed profiles comprises selecting a default response speed profile for the application.

20. The system of claim 16, wherein determining that a response speed profile change condition exists comprises identifying a change from a first mode of the application to a second mode of the application.

\* \* \* \* \*